US012748482B2

(12) United States Patent
Park

(10) Patent No.: US 12,748,482 B2
(45) Date of Patent: Sep. 29, 2026

(54) META VERSE SYSTEM

(71) Applicant: EdgeDX Co., Ltd., Seoul (KR)

(72) Inventor: Dong Uk Park, Seoul (KR)

(73) Assignee: EdgeDX Co., Ltd., Seoul (KR)

( * ) Notice: Subject to any disclaimer, the term of this patent is extended or adjusted under 35 U.S.C. 154(b) by 130 days.

(21) Appl. No.: 18/227,317

(22) Filed: Jul. 28, 2023

(65) Prior Publication Data

US 2024/0037832 A1 Feb. 1, 2024

(30) Foreign Application Priority Data

Jul. 29, 2022 (KR) ........................ 10-2022-0094480

(51) Int. Cl.

*G06T 15/00* (2011.01)
*G06T 7/20* (2017.01)
*G06T 13/40* (2011.01)

(52) U.S. Cl.

CPC ................ *G06T 15/00* (2013.01); *G06T 7/20* (2013.01); *G06T 13/40* (2013.01); *G06T 2200/24* (2013.01); *G06T 2207/20021* (2013.01); *G06T 2207/30196* (2013.01); *G06T 2215/16* (2013.01)

(58) Field of Classification Search

CPC ........... G06T 15/00; G06T 7/20; G06T 13/40; G06T 2200/24; G06T 2207/20021; G06T 2207/30196; G06T 2215/16; G06T 13/60; G06F 3/011; A63F 13/212; A63F 13/213; A63F 13/60; A63F 2300/8082

See application file for complete search history.

(56) References Cited

U.S. PATENT DOCUMENTS

| | | | | |
|---|---|---|---|---|
| 8,386,918 | B2 * | 2/2013 | Do | G06F 3/011 715/706 |
| 9,338,200 | B2 * | 5/2016 | Park | A63F 13/79 |
| 10,242,032 | B2 * | 3/2019 | Sundaresan | G06F 16/5854 |
| 2019/0240581 | A1 * | 8/2019 | Walker | A63F 13/65 |
| 2023/0334790 | A1 * | 10/2023 | Etwaru | G06T 19/20 |

FOREIGN PATENT DOCUMENTS

| | | | |
|---|---|---|---|
| JP | 6706298 | B2 * | 6/2020 |
| KR | 101178494 | B1 * | 9/2012 |
| KR | 10-2013-0068593 | A | 6/2013 |
| KR | 10-2014-0036555 | A | 3/2014 |

(Continued)

OTHER PUBLICATIONS

Dittrich et al. Probabilistic Modeling of Real-world Scenes in a Virtual Environment [Online]. 2015 [Retrieved on Dec. 11, 2025]. Retrieved from the Internet: <URL: https://pdfs.semanticscholar.org/ebe0/7afa5bfad16dbfbebeb37dc36dee4f706e4e.pdf> (Year: 2015).*

(Continued)

*Primary Examiner* — King Y Poon
*Assistant Examiner* — Michelle Hau Ma

(57) ABSTRACT

Provided is a metaverse system. The metaverse system for providing metaverse content virtualizes a target space as a digital twin but statistically applies attributes and action patterns of objects in the target space to virtual objects in a virtual space, thereby reproducing the environment, atmosphere, and the like of the target space without accurately copying the attributes and action patterns of objects.

16 Claims, 5 Drawing Sheets

(56) References Cited

FOREIGN PATENT DOCUMENTS

| | | | | |
|---|---|---|---|---|
| KR | 102364275 B1 * | 2/2022 | ............. | G06Q 50/10 |
| KR | 102376390 B1 * | 3/2022 | | |

OTHER PUBLICATIONS

Onrust et al. Procedural generation and interactive web visualization of natural environments [Online]. Jun. 21, 2015 [Retrieved on Dec. 11, 2025]. Retrieved from the Internet: <URL: https://dl.acm.org/doi/pdf/10.1145/2775292.2775306 > (Year: 2015).*

Non-final Office Action mailed on Apr. 26, 2023 from the Korean Patent Office for Application No. 10-2022-0094480.

Notice of Allowance mailed on Oct. 10, 2023 from the Korean Patent Office for Application No. 10-2022-0094480.

* cited by examiner

META VERSE SYSTEM

CROSS-REFERENCE TO RELATED APPLICATION(S)

This application claims priority from Korean Patent Application No. 10-2022-0094480, filed on Jul. 29, 2022, in the Korean Intellectual Property Office, the disclosure of which is incorporated herein by reference in its entirety.

BACKGROUND

1. Field

The following description relates to a metaverse technology, and more particularly, to a metaverse technology for reflecting attributes and action patterns of objects present in an actual space in a virtual space.

2. Description of Related Art

A metaverse is a platform which enables users to do various activities that may be performed in the real world in a three-dimensional (3D) virtual world through avatars. The term "metaverse" is a combination of "meta," which refers to processing, abstraction, and transcendence, and "universe," which refers to the real world, and the word refers to a 3D virtual world. This is a concept that is more advanced than virtual reality. In a metaverse, virtual worlds, such as the world wide web (VWWV), the Internet, and the like, are absorbed into the real world, and avatars may interact with each other and act like in the real world.

Metaverses are being fused with fourth industrial revolution technologies, such as Internet of things (IoT), cloud, fifth generation (5G) communication, and the like, to create a new economic ecosystem in various industrial fields, such as games, social networking services (SNSs), education, medical care, and the like, and various examples of metaverses are emerging.

Also, as a fundamental technology of a metaverse, digital twin technology which integrates a virtual world with the real world in real time is being applied mainly in manufacturing factories. The digital twin technology is a technology for creating a twin of a real-world entity on a computer, simulating a situation that may occur in the real world, and predicting a result of the situation in the real world.

When the virtual world of a metaverse is modeled using the digital twin technology, a more realistic experience is possible. However, a process of accurately copying actions of objects (e.g., people) in the real world to the virtual world requires a great deal of resources and thus is nearly impossible to achieve in practice. Accordingly, a method is necessary to efficiently implement a virtual world of a metaverse to closely correspond to a situation in the real world.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The following description relates to providing a system for implementing a situation in a virtual space of a metaverse in synchronization with a situation in a real space.

The following description also relates to providing a system for efficiently implementing a virtual space of a metaverse in synchronization with a situation in a real space by analyzing attributes and action patterns of objects active in the real space and statistically applying the attributes and action patterns to artificial intelligence (AI) characters active in the virtual space.

Technical objects to be achieved in the present invention are not limited to those described above, and other technical objects that have not been described will be clearly understood by those of ordinary skill in the art from the following description.

In one general aspect, a metaverse system includes a metaverse server and a metaverse terminal, and the metaverse server renders metaverse content.

The metaverse server includes a virtual space generator, an object information collector, a first virtual object generator, a first virtual object placement part, a first virtual object motion controller, a first rendering part, and a metaverse content transmitter.

The virtual space generator generates a virtual space accurately modeled from a target space on the basis of space information and placement information of things collected from the target space and a captured image of the target space.

The object information collector detects objects in the target space by analyzing an image captured through at least one camera and collects attribute information and action pattern information defined for each of the detected objects.

The first virtual object generator statistically processes the collected object-specific attribute information and generates virtual objects on the basis of statistics.

The first virtual object placement part generates object placement information for placing the generated virtual objects in the virtual space.

The first virtual object motion controller statistically processes the collected object-specific action pattern information and generates object motion data for controlling motions of the virtual objects placed in the virtual space on the basis of statistics.

The first rendering part renders the metaverse content using the virtual space, the object placement information, and the object motion data.

The metaverse content transmitter transmits the rendered metaverse content to a connected terminal.

There is at least one metaverse terminal and the metaverse terminal receives the metaverse content from the metaverse server and plays the received metaverse content.

The virtual space generator may collect external environment information and generate a virtual space reflecting the collected external environment information.

The virtual space generated by the virtual space generator may be divided into a plurality of areas, the object information collector may collect object number information from each area of the target space corresponding to the virtual space, and the first virtual object placement part may place the objects in the areas of the virtual space on the basis of the collected area-specific object number information.

The metaverse server of the metaverse system may further include a first avatar controller, the first avatar controller may place a user avatar having attributes, which are set by a user who accesses the metaverse server, in the virtual space, and the first rendering part may render the metaverse content from the user avatar's point of view.

The metaverse terminal may transmit a motion control command for the user avatar input through a user interface (UI) to the metaverse server, and the first avatar controller receiving the motion control command for the user avatar may generate object motion data for controlling a motion of the user avatar placed in the virtual space.

When the metaverse terminal includes a sensor part, the sensor part may detect the user's motion and generate a motion control command for the user avatar, and the metaverse terminal may transmit the generated motion control command for the user avatar to the metaverse server. Here, the first avatar controller receiving the motion control command for the user avatar may generate object motion data for controlling a motion of the user avatar placed in the virtual space.

In another general aspect, a metaverse system includes a metaverse server and a metaverse terminal, and the metaverse server renders metaverse content.

The metaverse server includes a virtual space generator, an object information collector, and a metaverse data transmitter.

The virtual space generator generates a virtual space accurately modeled from a target space on the basis of space information and placement information of things collected from the target space and a captured image of the target space.

The object information collector detects objects in the target space by analyzing an image captured in real time through at least one camera and collects attribute information and action pattern information defined for each of the detected objects.

The metaverse data transmitter transmits generated virtual space modeling data and the collected object-specific attribute information and action pattern information to a connected terminal.

The metaverse system includes at least one metaverse terminal, and the metaverse terminal includes a second virtual object generator, a second virtual object placement part, a second virtual object motion controller, a second rendering part, and a metaverse player.

The second virtual object generator statistically processes the received object-specific attribute information and generates virtual objects on the basis of statistics.

The second virtual object placement part generates object placement information for placing the generated virtual objects in the virtual space.

The second virtual object motion controller statistically processes the received object-specific action pattern information and generates object motion data for controlling motions of the virtual objects placed in the virtual space on the basis of statistics.

The second rendering part renders the metaverse content in real time using the virtual space modeling data and the object motion data.

The metaverse player plays the rendered metaverse content.

The virtual space generator may collect external environment information and generate a virtual space reflecting the collected external environment information.

The virtual space generated by the virtual space generator may be divided into a plurality of areas, the object information collector may collect object number information from each area of the target space corresponding to the virtual space, and the second virtual object placement part may place the objects in areas of the virtual space on the basis of the collected area-specific object number information.

The metaverse terminal of the metaverse system may further include a second avatar controller, the second avatar controller may place a user avatar having attributes set by a user in the virtual space, and the second rendering part may render the metaverse content from the user avatar's point of view.

The second avatar controller may generate object motion data for controlling a motion of the user avatar placed in the virtual space according to a motion control command for the user avatar input through a UI.

When the metaverse terminal includes a sensor part for detecting the user's motion, the sensor part may detect the user's motion and generate a motion control command for the user avatar, and the second avatar controller may generate object motion data for controlling a motion of the user avatar placed in the virtual space according to the generated motion control command for the user avatar.

Other features and aspects will be apparent from the following detailed description, the drawings, and the claims.

Figure 1:
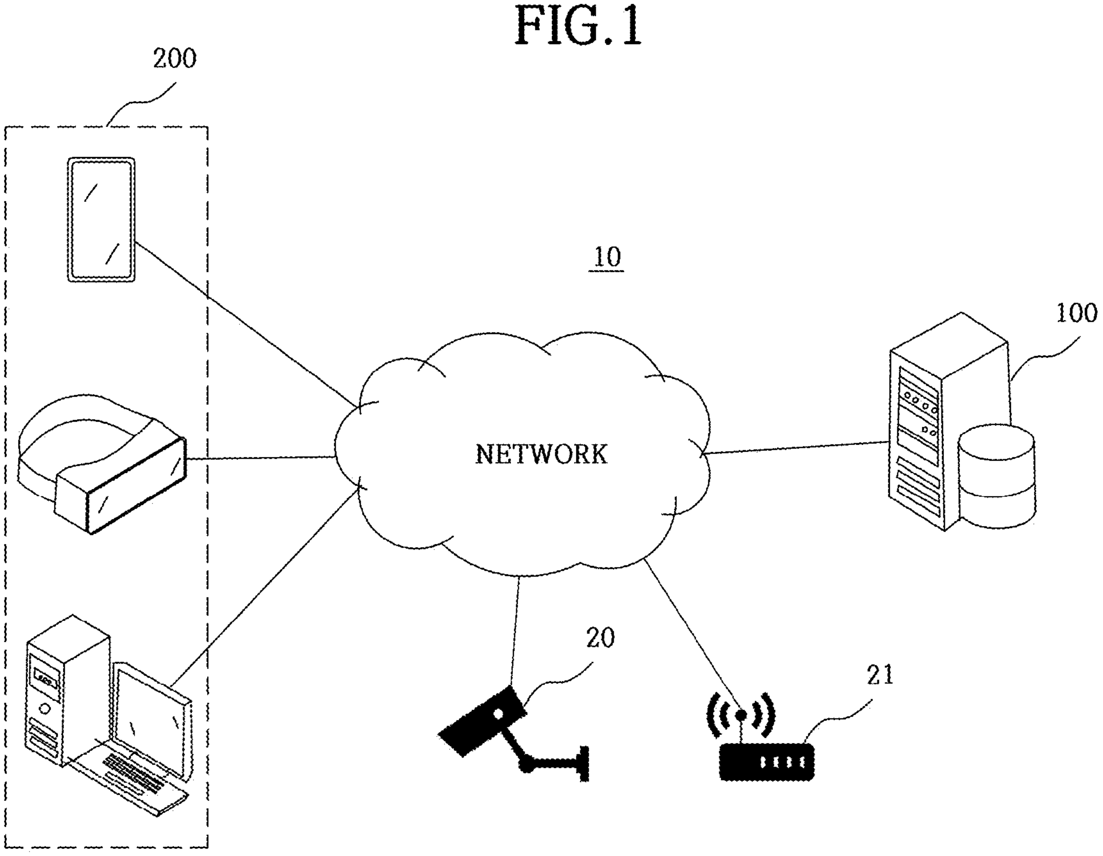
FIG. 1 is a diagram illustrating a configuration of a metaverse system according to the present invention.

Throughout the accompanying drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The above-described and additional aspects of the present invention will be specified through exemplary embodiments described with reference to the accompanying drawings. In each embodiment, various combinations of components are possible unless described otherwise or contradictory to each other. Each block in a block diagram may represent a physical component in one case, but in another case, each block may be a logical representation of a part of a function of one physical component or a function of a plurality of physical components. In some cases, a block or a part thereof may be a set of program commands. All or some of such blocks may be implemented by hardware, software, or a combination of hardware and software.

FIG. 1 is a diagram illustrating a configuration of a metaverse system according to the present invention. A metaverse system 10 according to the present invention includes a metaverse server 100 and at least one metaverse terminal 200.

The metaverse server 100 is a computing device including a processor and a memory which is connected to the processor and includes program commands executable by the processor. The metaverse server 100 may be a computing device including a storage device, a display, an input device, and the like in addition to a processor and a memory. The processor executes program commands, and the memory is connected to the processor and stores program commands executable by the processor, data to be used in computation by the processor, data processed by the processor, and the like. According to an aspect of the present invention, a service server may include multiple computing devices or may include multiple edge artificial intelligence (AI) boxes which are installed adjacent to at least one metaverse target space to process data input from sensor devices including cameras and the like installed in the target space, and a server or cloud server connected to the multiple edge AI boxes through a network.

According to a first exemplary embodiment of the present invention, the metaverse server 100 provides a metaverse service by transmitting, to the connected metaverse terminal 200, metaverse content obtained by placing AI characters which are virtual objects generated by copying objects, such as people and the like, present in a target space in a virtual space which is obtained by virtualizing the target space through three-dimensional (3D) modeling on the basis of a digital twin technology. In order for the virtual space to be synchronized with an environment of the target space, attributes and action patterns of the objects present in the target space are detected through image analysis and the like, and the corresponding attributes are statistically applied to the AI characters. For example, when a male-to-female ratio of people present in the target space is 7:3, AI characters placed in the virtual space are generated at the same male-to-female ratio of 7:3. In the first exemplary embodiment of the present invention, metaverse content is rendered by the metaverse server 100 and provided to the connected metaverse terminal 200.

The metaverse terminal 200 may be a mobile device, such as a smartphone, a tablet device, or the like, a head mount display (HMD) worn by a user, or a personal computer (PC) device such as a desktop computer, a laptop computer, or the like. As shown in FIG. 1, the metaverse terminal 200 communicates with the metaverse server 100 through the network. In this case, there are no limitations on communication methods of the network.

According to a second exemplary embodiment of the present invention, the metaverse server 100 virtualizes a target space through 3D modeling on the basis of the digital twin technology, collects information on attributes and action patterns of objects, such as people and the like, present in the target space, and then transmits the collected information to the connected metaverse terminal 200. Unlike the first exemplary embodiment, the metaverse server 100 does not render metaverse content.

According to the second exemplary embodiment, the metaverse terminal 200 receives virtual space modeling data and the attribute information and action pattern information of the objects present in the target space from the metaverse server 100, generates and places AI characters which are virtual objects in a virtual space on the basis of the received data and information, and then renders and plays metaverse content.

According to the first exemplary embodiment and the second exemplary embodiment of the present invention, data collected through devices, such as cameras and the like, installed in a target space from which a virtual space will be generated is analyzed to find an environment of the target space, that is, the number of objects, such as people and the like, defined attributes of each individual object (e.g., in the case of a person, the sex, the age, the type and color of clothes worn by the person, and accessories worn or carried by the person), and an action pattern of each individual object. After that, in the case of generating virtual objects, object attributes are statistically generated, and motion data for controlling motions of the generated virtual objects is also statistically generated. Therefore, even when virtual objects in a virtual space corresponding to objects in a target space do not imitate attributes and actions of the objects, attributes and actions of the virtual objects generated and placed in the virtual space are statistically the same as those of objects in the target space. Accordingly, a similar environment and atmosphere to those of the target space are reproduced in the virtual space.

Figure 2:
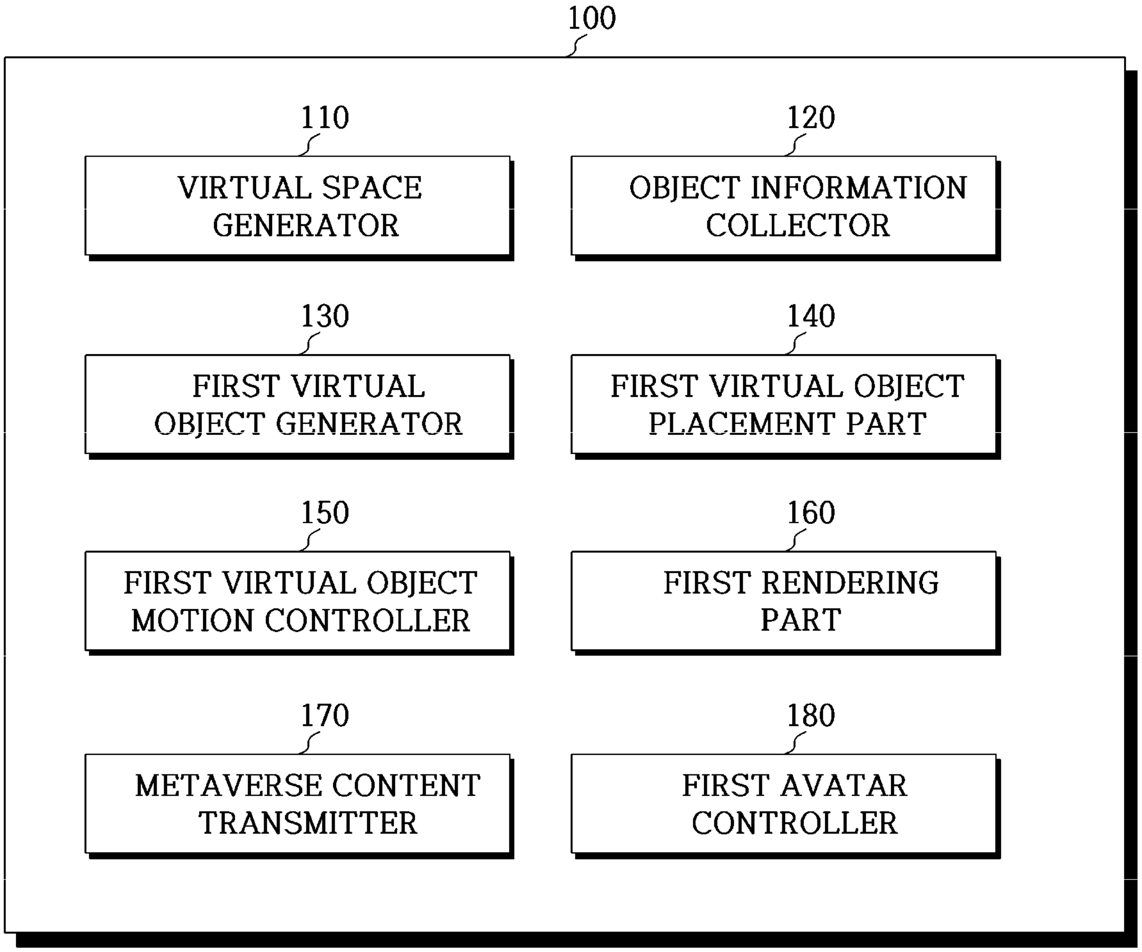
FIG. 2 is a block diagram of a metaverse server according to a first exemplary embodiment of the present invention.
Figure 3:
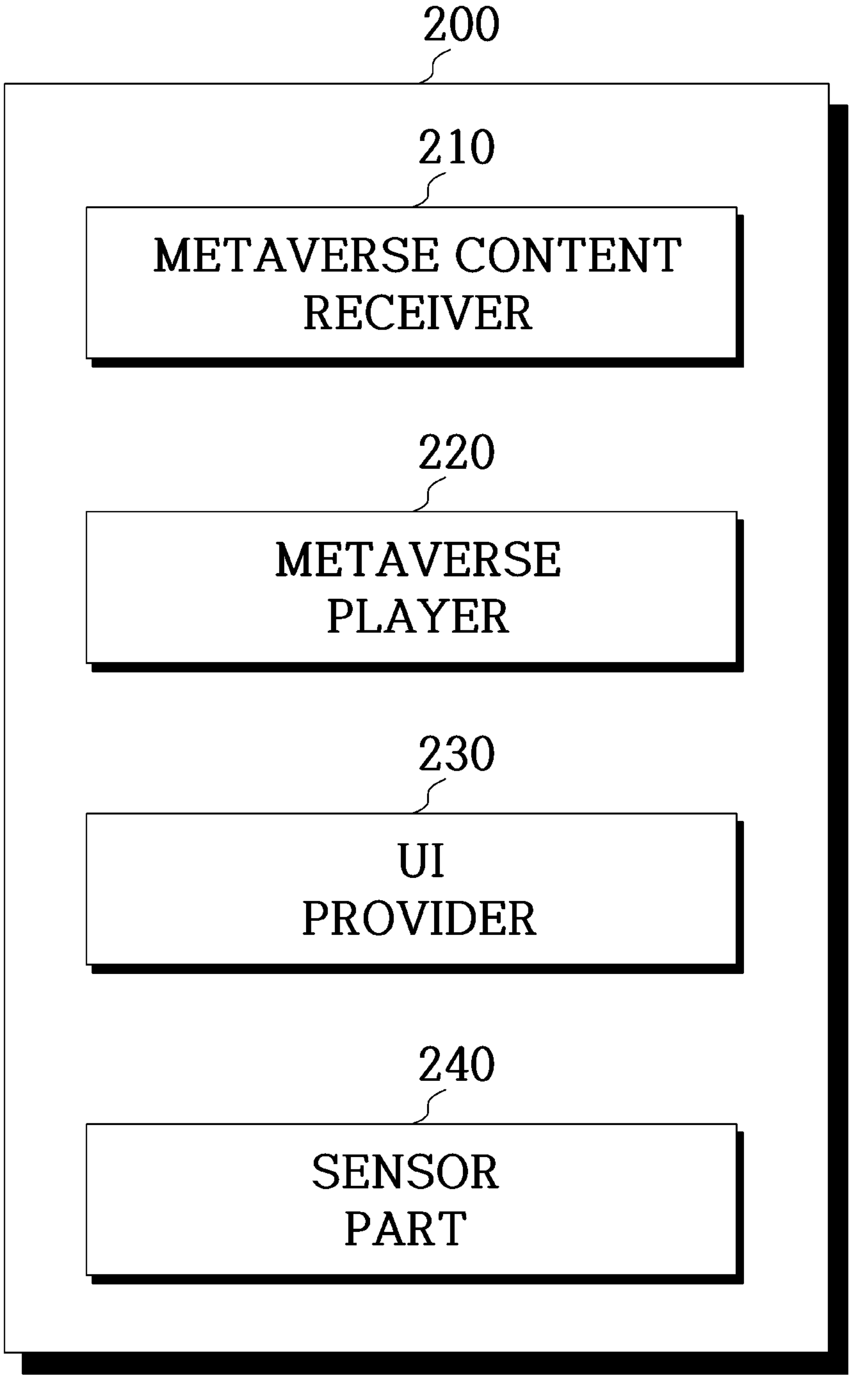
FIG. 3 is a block diagram of a metaverse terminal according to the first exemplary embodiment of the present invention.

FIGS. 2 and 3 are block diagrams of a metaverse server and a metaverse terminal according to the first exemplary embodiment of the present invention. The metaverse system 10 according to the first exemplary embodiment of the present invention includes the metaverse server 100 and the metaverse terminal 200, and the metaverse server 100 renders metaverse content.

The metaverse server 100 according to the first exemplary embodiment includes an object information collector 120, a first virtual object generator 130, a first virtual object placement part 140, a first virtual object motion controller 150, a first rendering part 160, and a metaverse content transmitter 170.

At least some functions of the object information collector 120, the first virtual object generator 130, the first virtual object placement part 140, the first virtual object motion controller 150, the first rendering part 160, and the metaverse content transmitter 170 are implemented as a program command set executed by a processor.

The object information collector 120 detects objects in a target space by analyzing an image captured through at least one camera 20 and collects attribute information and action pattern information defined for each of the detected objects. In the present invention, objects are people, animals, and items carried by people present in a target space rather than things naturally or artificially disposed in the target space, that is, things that enter the target space from outside the target space.

The object information collector 120 detects objects present in the target space by mainly analyzing at least one captured image of the target space. There are no limitations on a technology for detecting objects in the image, and in general, various object detection algorithms employing deep learning may be used.

The object information collector 120 collects information on the types and number of detected objects and additionally collects various attribute information of each detected object. Attributes of objects collected by the object information collector 120 are predefined for each object. For example, when an object is a person, attributes that the object information collector 120 is set to collect from the person may include a sex, an age group, whether the person is a member of a couple, whether the person is wearing a hat, a hairstyle, a color of clothes, a type of clothes, whether the person is wearing glasses, whether the person is wearing a watch, and the like. Attributes defined for collecting attribute information from the same object may vary depending on a type of target space from which a virtual space is generated.

The object information collector 120 may collect object information not only through image analysis but also from devices including sensors installed in the target space.

As an example, the object information collector 120 may detect objects from access information of devices connected to wireless communication connection devices 21, such as an access point (AP), a gateway, and the like, in the target space and collect object attribute information. In other words, the object information collector 120 may detect mobile objects using information on connection of mobile devices, such as smartphones and the like, used by people entering the target space to a WiFi AP installed in the target space, and collect the types of mobile devices (e.g., in the case of smartphones, types according to the manufacturers) as attribute information using the access information. For example, when people in the target space are using smartphones, collected information may be the number of smartphones being used, the types of smartphones, and the type-specific numbers of smartphones.

The first virtual object generator 130 generates virtual objects corresponding to objects present in the target space. The objects generated by the first virtual object generator 130 may be AI characters that may perform motions themselves.

The first virtual object generator 130 does not substantially copy the objects in the target space but generates virtual objects by statistically applying object attributes. For example, when 10 people are detected in the target space and three of them are females, the first virtual object generator 130 merely generates 30% of virtual objects as females and 70% as males but does not necessarily generate objects corresponding to male objects as virtual objects having male attributes.

To statistically apply object attributes in the case of generating virtual objects, the first virtual object generator 130 statistically processes and stores the object attribute information collected by the object information collector 120. Even when the first virtual object generator 130 does not give the same attributes to virtual objects as in the environment of the target space, statistically the same attributes are given. Accordingly, the atmosphere or trend of the target space is also shown in a virtual space.

The first virtual object placement part 140 generates object placement information of the virtual objects generated by the first virtual object generator 130 in the virtual space modeled from the target space. The virtual space is 3D modeling data of the target space obtained through a separate creation tool.

The first virtual object placement part 140 may randomly place the generated virtual objects regardless of positions of corresponding objects in the target space.

According to another aspect of the present invention, the first virtual object placement part 140 may not randomly place the generated virtual objects in the virtual space but may divide the target space and the virtual space into multiple areas and place the objects in corresponding areas of the virtual space on the basis of object placement information for each area of the target space. In other words, the generated virtual space may be divided into multiple areas, the object information collector 120 may collect information on the number of objects present in each area of the target space corresponding to the virtual space, and the first virtual object placement part 140 may place objects in each area of the virtual space on the basis of the collected area-specific object number information. Here, the first virtual object placement part 140 may not make the positions of the virtual objects placed in the virtual space exactly the same as the positions of the objects placed in the target space but may place the same number of virtual objects as the number of objects in each area.

Like the first virtual object generator 130, the first virtual object motion controller 150 generates object motion data of the generated virtual objects on the basis of the action pattern information of the objects present in the target space which is collected by the object information collector 120. However, the first virtual object motion controller 150 does not substantially copy action patterns of the objects in the target space but statistically applies the object action patterns. For example, when there are 10 people in the target space, with seven of them looking at products on display and three looking at their smartphones, the first virtual object motion controller 150 merely generates 70% of motion data of the virtual objects to be an action pattern of looking at products on display and 30% to be an action pattern of looking at their smartphones and does not generate object motion data to cause the virtual objects corresponding to the objects in the target space to do the actions taken by the objects in the target space. To statistically apply action patterns in the case of generating object motion data of the virtual objects, the first virtual object motion controller 150 statistically processes and stores the object-specific action pattern information collected by the object information collector 120 and generates object motion data for controlling motions of the virtual objects placed in the virtual space on the basis of the stored statistics. Even when the first virtual object motion controller 150 does not generate the same motion data of the virtual objects as in the environment of the target space, statistically the same object motion data is generated, and thus the atmosphere of the virtual space becomes similar to that of the target space.

The first rendering part 160 renders metaverse content using the virtual space, the object placement information, and the object motion data. The first rendering part 160 performs rendering in real time using a real-time 3D rendering engine, for example, a game engine such as an unreal engine, a unity engine, or the like. The foregoing game engine is exemplary, and the rendering engine is not limited to a game engine.

The metaverse content transmitter 170 transmits the rendered metaverse content to a connected terminal. The metaverse content transmitter 170 transmits the metaverse content to a terminal which requests a metaverse service, and there are no limitations on a network used in this case. The metaverse system 10 includes at least one metaverse terminal 200 according to the first exemplary embodiment, and the metaverse terminal 200 receives metaverse content from the metaverse server 100 and plays the metaverse content.

The metaverse terminal 200 according to the first exemplary embodiment includes a metaverse content receiver 210, a metaverse player 220, and a user interface (UI) provider 230. The metaverse content receiver 210 receives the metaverse content in real time from the connected metaverse server 100, the metaverse player 220 plays the received metaverse content through a display of the terminal 200, and the UI provider 230 provides a metaverse-related UI.

At least some functions of the metaverse content receiver 210, the metaverse player 220, and the UI provider 230 are implemented as a program command set executed by a processor.

The metaverse terminal 200 may be a virtual reality (VR) or augmented reality (AR) device and may be a computing device including an HMD or a terminal for playing video content such as a desktop computer, a laptop computer, a smartphone, a tablet PC, smart glasses, a mobile phone, a game machine, or the like.

According to an additional aspect of the present invention, the metaverse server 100 may further include a virtual space generator 110.

At least some functions of the virtual space generator 110 are implemented as a program command set executed by a processor.

The virtual space generator 110 collects and stores space information of a real space for which metaverse content will be generated, that is, a target space. The space information may be information in the form of a map, such as an outdoor map or indoor map, or information obtained by converting a 3D drawing or design drawing of the space into data. However, the space information is not limited thereto and may be any information from which information such as a size, a shape, a range, and the like of the target space can be found.

Also, the virtual space generator 110 collects and stores information, particularly placement information, on things such as items, decorations, products for sale, showcases, mannequins, and the like placed in the target space.

The virtual space generator 110 generates a virtual space accurately modeled from the target space on the basis of the collected space information and object placement information and the captured image of the target space. The virtual space generated by the virtual space generator 110 may be 3D modeling data or rendered 3D space content.

The virtual space generator 110 may additionally collect external environment information including the weather, the time, the season, and the like and reflect the collected external environment information when generating the virtual space. For example, when it rains or snows, the virtual space generator 110 may generate the virtual space so that it may be seen that it is raining or snowing through a window generated in the virtual space. The external environment information may vary depending on a type of target space. For example, when the target space is a clothing store, product purchase and sales information may be external environment information, and in this case, the external environment information may be taken into consideration when products to be displayed on showcases are placed in the virtual space.

Since a virtual space generated by the metaverse server 100 according to the first exemplary embodiment may vary depending on a service to be used by a connected server, the virtual space generated by the metaverse server 100 may vary depending on a type of provided service. Also, when various terminals require the same virtual space, metaverse content rendered for one terminal may be shared, or metaverse content may be newly rendered for every terminal and provided. In addition, the metaverse server 100 may be a cloud server, and one server may be assigned to each virtual space to provide service.

According to an additional aspect of the present invention, the metaverse server 100 of the metaverse system 10 may further include a first avatar controller 180.

The first avatar controller 180 places a user avatar having attributes, which are set by a user who accesses the metaverse server 100, in the virtual space. The AI characters, that is, the virtual objects, generated by the first virtual object generator 130 are objects present in the target space rather than objects of users who access the metaverse server 100. Accordingly, when it is necessary to display the user avatar according to a metaverse service used by the user, the first avatar controller 180 places the user avatar in the virtual space. When no user avatar has been generated for the user who access the metaverse server 100, or the set avatar attributes differ from attributes of a previously generated avatar, the first avatar controller 180 newly generates a user avatar and places the user avatar in the virtual space.

Here, the first rendering part 160 may render the metaverse content from the user avatar's point of view. Also, the user may switch to a third party's point of view rather than the user avatar's point of view through the UI displayed on the metaverse terminal 200. In this case, the user avatar is additionally rendered and displayed in the virtual space.

Also, the metaverse terminal 200 transmits a motion control command for the user avatar input through the UI to the metaverse server 100.

The first avatar controller 180 generates object motion data for controlling a motion of the user avatar placed in the virtual space on the basis of the avatar motion control command transmitted by the metaverse terminal 200.

The metaverse terminal 200 according to the first exemplary embodiment may further include a sensor part 240. The sensor part 240 includes a sensor for sensing the user's motion. For example, when the metaverse terminal 200 is an HMD, the sensor part 240 may include a Kinect sensor for detecting the user's motion and a wearable sensor attached to the user's body. However, the sensor part 240 is not limited thereto, and any sensor for detecting and recognizing the user's motion may be a sensor of the sensor part 240. The sensor part 240 may be a physically separate device from the metaverse terminal 200.

The sensor part 240 detects the user's motion and generates a motion control command for the user avatar. The metaverse terminal 200 transmits the motion control command for the user avatar generated by the sensor part 240 to the metaverse server 100. Here, the first avatar controller 180 receiving the motion control command generates object motion data for controlling a motion of the user avatar placed in the virtual space.

Figure 4:
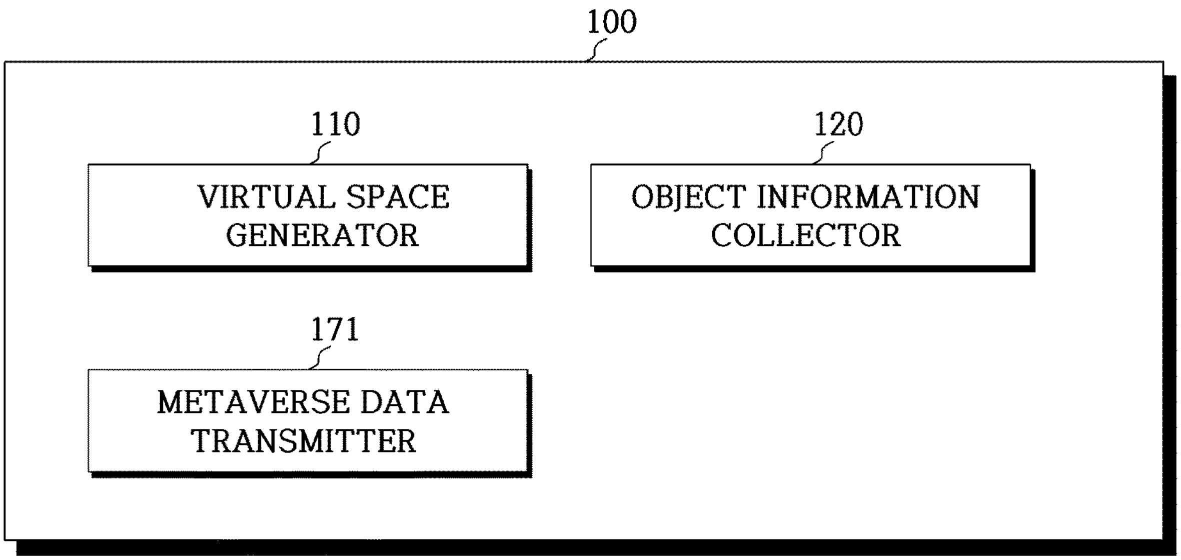
FIG. 4 is a block diagram of a metaverse server according to a second exemplary embodiment of the present invention.
Figure 5:
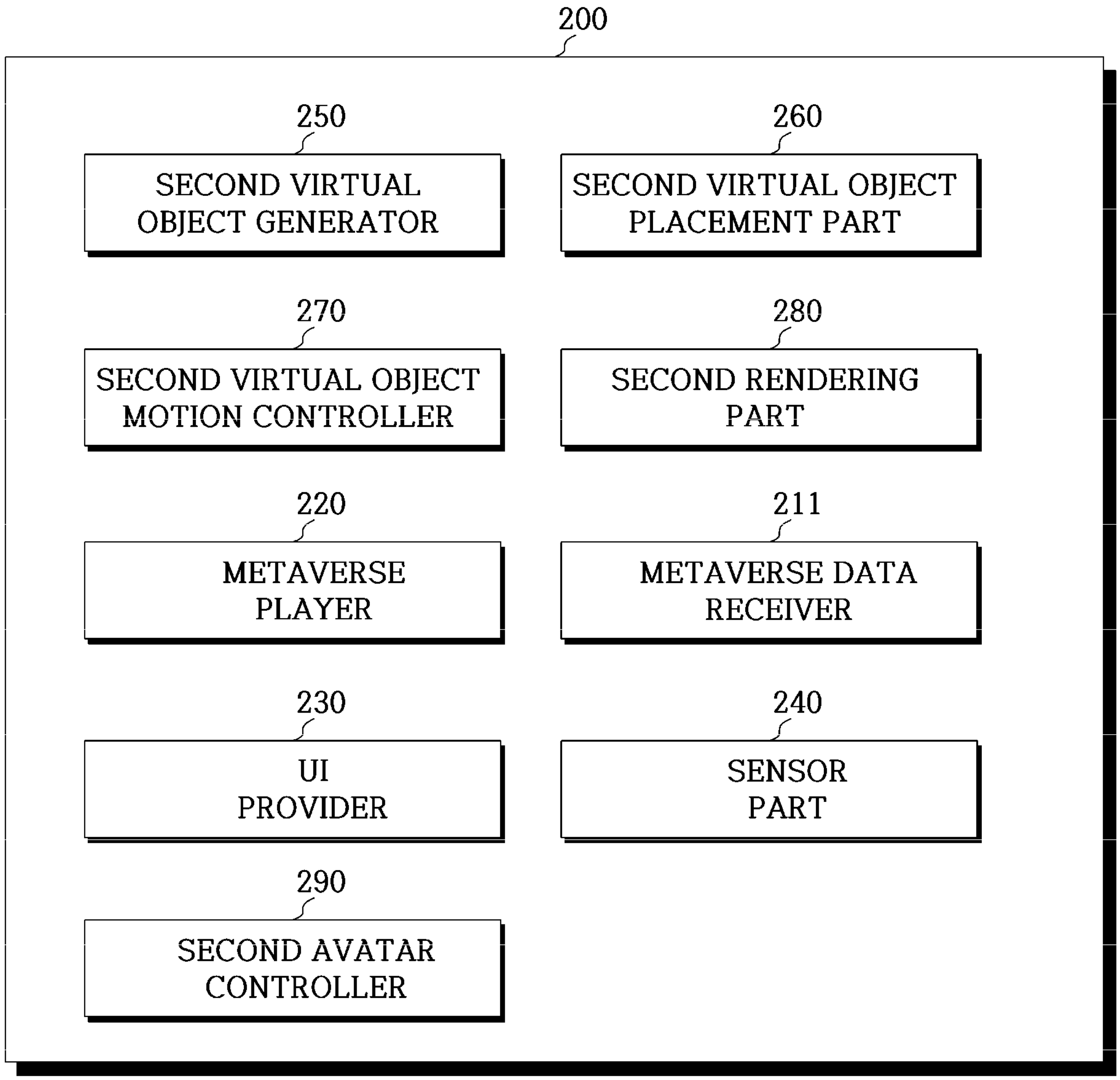
FIG. 5 is a block diagram of a metaverse terminal according to the second exemplary embodiment of the present invention.

FIGS. 4 and 5 are block diagrams of a metaverse server and a metaverse terminal according to the second exemplary embodiment of the present invention. The metaverse system 10 according to the second exemplary embodiment of the present invention includes the metaverse server 100 and the metaverse terminal 200, and the metaverse terminal 200 renders metaverse content.

The metaverse server 100 according to the second exemplary embodiment includes an object information collector 120 and a metaverse data transmitter 171.

Like in the first exemplary embodiment, at least some functions of the object information collector 120 are implemented as a program command set executed by a processor, and at least some functions of the metaverse data transmitter 171 are also implemented as a program command set executed by a processor.

The object information collector 120 detects objects in a target space by analyzing an image captured through at least one camera and collects attribute information and action pattern information defined for each of the detected objects. In the present invention, objects are people, animals, and items carried by people present in a target space rather than things naturally or artificially disposed in the target space, that is, things that enter the target space from outside the target space.

The object information collector 120 detects objects present in the target space by mainly analyzing at least one captured image of the target space. There are no limitations on a technology for detecting objects in the image, and in general, various object detection algorithms employing deep learning may be used.

The object information collector 120 collects information on the types and number of detected objects and additionally collects various attribute information for each detected object. Attributes of objects collected by the object information collector 120 are predefined for each object. For example, when an object is a person, attributes that the object information collector 120 is set to collect from the person may include a sex, an age group, whether the person is a member of a couple, whether the person is wearing a hat, a hairstyle, a color of clothes, a type of clothes, whether the person is wearing glasses, whether the person is wearing a watch, and the like. Attributes defined for collecting attribute information from the same object may vary depending on a type of target space from which a virtual space is generated.

The object information collector 120 may collect object information not only through image analysis but also from devices including sensors installed in the target space.

As an example, the object information collector 120 may detect objects from access information of devices connected to wireless communication connection devices, such as an AP, a gateway, and the like, in the target space and collect object attribute information. In other words, the object information collector 120 may detect mobile objects using information on connection of mobile devices, such as smartphones and the like, used by people entering the target space to a WiFi AP installed in the target space, and collect the types of mobile devices (e.g., in the case of smartphones, types according to the manufacturers) as attribute information using the access information. For example, when people in the target space are using smartphones, collected information may be the number of smartphones being used, the types of smartphones, and the type-specific numbers of smartphones.

The metaverse data transmitter 171 transmits a generated virtual space, that is, virtual space modeling data, and the collected object-specific attribute information and action pattern information to a connected terminal. The virtual space is 3D modeling data of the target space obtained through a separate creation tool.

The metaverse content transmitter 171 transmits the virtual space and the collected object-specific attribute information and action pattern information so that a terminal which requests a metaverse service may render metaverse content. There are no limitations on a network used in this case.

The metaverse system 10 includes at least one metaverse terminal 200 according to the second exemplary embodiment, and the metaverse terminal 200 includes a metaverse data receiver 211, a UI provider 230, a second virtual object generator 250, a second virtual object placement part 260, a second virtual object motion controller 270, a second rendering part 280, and a metaverse player 220.

At least some functions of the metaverse data receiver 211, the UI provider 230, the second virtual object generator 250, the second virtual object placement part 260, the second virtual object motion controller 270, the second rendering part 280, and the metaverse player 220 are implemented as a program command set executed by a processor of the metaverse terminal 200.

The metaverse terminal 200 may be a VR or AR device and may be a computing device including an HMD or a terminal for playing video content such as a desktop computer, a laptop computer, a smartphone, a tablet PC, smart glasses, a mobile phone, a game machine, or the like.

The metaverse data receiver 211 receives the virtual space modeling data and the collected object-specific attribute information and action pattern information transmitted by the connected metaverse server 100, and the UI provider 230 provides a metaverse-related UI.

The second virtual object generator 250 generates virtual objects corresponding to objects present in the target space. The objects generated by the second virtual object generator 250 may be AI characters that may perform motions themselves. The second virtual object generator 250 does not substantially copy the objects in the target space but generates virtual objects by statistically applying object attributes. For example, when 10 females are detected in the target space, with eight of them wearing skirts and two of them wearing pants, the second virtual object generator 250 merely generates 80% of virtual objects with female attributes wearing skirts and 20% wearing pants but does not necessarily generate clothing of objects corresponding to female objects in the target space to be identical to clothing of the female objects in the target space. To statistically apply object attributes in the case of generating virtual objects, the second virtual object generator 250 statistically processes and stores object attribute information received from the metaverse server 100. Even when the second virtual object generator 250 does not give the same attributes to virtual objects as in the environment of the target space, statistically the same attributes are given. Accordingly, the atmosphere or trend of the target space is also shown in the virtual space.

The second virtual object placement part 260 generates object placement information for placing the virtual objects generated by the second virtual object generator 250 in the virtual space. The second virtual object placement part 260 may randomly place the generated virtual objects regardless of positions of corresponding objects in the target space.

According to another aspect of the present invention, the second virtual object placement part 260 may not randomly place the generated virtual objects in the virtual space but may divide the target space and the virtual space into multiple areas and place the objects in corresponding areas of the virtual space on the basis of object placement information for each area of the target space. In other words, the generated virtual space may be divided into multiple areas, the object information collector 120 of the metaverse server 100 may collect information on the number of objects present in each area of the target space corresponding to the virtual space, and the second virtual object placement part 260 may place objects in each area of the virtual space on the basis of the collected area-specific object number information. Here, the second virtual object placement part 260 may not make the positions of the virtual objects placed in the virtual space exactly the same as the positions of the objects placed in the target space but may place the same number of virtual objects as the number of objects in each area.

Like the second virtual object generator 250, the second virtual object motion controller 270 generates object motion data of the generated virtual objects on the basis of the action pattern information of the objects present in the target space which is collected by the object information collector 120 of the metaverse server 100. However, the second virtual object motion controller 270 does not substantially copy action patterns of the objects in the target space but statistically applies the object action patterns. For example, when there are 10 people in the target space, with seven of them looking at products on display and three looking at their smartphones, the second virtual object motion controller 270 merely generates 70% of motion data of the virtual objects to be an action pattern of looking at products on display and 30% to be an action pattern of looking at their smartphones and does not generate object motion data to cause the virtual objects corresponding to the objects in the target space to do the actions taken by the objects in the target space. To statistically apply action patterns in the case of generating object motion data of the virtual objects, the second virtual object motion controller 270 statistically processes and stores the object-specific action pattern information collected by the object information collector 120 and generates object motion data for controlling motions of the virtual objects placed in the virtual space on the basis of the stored statistics. Even when the second virtual object motion controller 270 does not generate the same motion data of the virtual objects as in the environment of the target space, statistically the same object motion data is generated, and thus the atmosphere of the virtual space becomes similar to that of the target space.

The second rendering part 280 renders metaverse content using the virtual space modeling data, the object placement information, and the object motion data. The second rendering part 280 performs rendering in real time using a real-time 3D rendering engine, for example, a game engine such as an unreal engine, a unity engine, or the like. The foregoing game engine is exemplary, and the rendering engine is not limited to a game engine.

The metaverse player 220 plays the metaverse content rendered by the second rendering part 280 through a display of the metaverse terminal 200.

According to the second exemplary embodiment, virtual space modeling data may vary depending on a service to be used by a connected terminal, and thus generated virtual space modeling data may vary according to a type of provided service. Also, when various terminals require the same virtual space, the same virtual space modeling data may be shared, or virtual space modeling data may be newly rendered for every terminal and provided.

According to an additional aspect of the present invention, the metaverse server 100 may further include a virtual space generator 110.

Like in the first exemplary embodiment, at least some functions of the virtual space generator 110 are implemented as a program command set executed by a processor.

The virtual space generator 110 collects and stores space information of a real space for which metaverse content will be generated, that is, the target space. The space information may be information in the form of a map, such as an outdoor map or indoor map, or information obtained by converting a 3D drawing or design drawing of the space into data. However, the space information is not limited thereto and may be any information from which information such as a size, a shape, a range, and the like of the target space can be found.

Also, the virtual space generator 110 collects and stores information, particularly placement information, on things such as items, decorations, products for sale, showcases, mannequins, and the like placed in the target space.

The virtual space generator 110 generates a virtual space accurately modeled from the target space on the basis of the collected space information and object placement information and the captured image of the target space. The virtual space generated by the virtual space generator 110 may be 3D modeling data or rendered 3D space content.

The virtual space generator 110 may additionally collect external environment information including the weather, the time, the season, and the like and reflect the collected external environment information when generating the virtual space. For example, when it rains or snows, the virtual space generator 110 may generate the virtual space so that it may be seen that it is raining or snowing through a window generated in the virtual space. The external environment information may vary depending on a type of target space. For example, when the target space is a clothing store, product purchase and sales information may be external environment information, and in this case, the external environment information may be taken into consideration when products to be displayed on showcases are placed in the virtual space.

According to an additional aspect of the second exemplary embodiment, the metaverse terminal 200 may further include a second avatar controller 290.

The second avatar controller 290 places a user avatar having attributes set by a user in the virtual space. The AI characters, that is, the virtual objects, generated by the second virtual object generator 250 are objects present in the target space rather than objects of users who accesses the metaverse server 100. Accordingly, when it is necessary to display the user avatar according to a metaverse service used by the user, the second avatar controller 290 places the user avatar in the virtual space. When no user avatar has been generated or the set avatar attributes differ from attributes of a previously generated avatar, the second avatar controller 290 newly generates a user avatar and places the user avatar in the virtual space.

Here, the second rendering part 280 may render the metaverse content from the user avatar's point of view. Also, the user may switch to a third party's point of view rather than the user avatar's point of view through the UI displayed on the metaverse terminal 200. In this case, the user avatar is additionally rendered and displayed in the virtual space.

Also, the second avatar controller 290 generates object motion data for controlling a motion of the user avatar placed in the virtual space according to a user avatar motion control command input through the UI.

The metaverse terminal 200 according to the second exemplary embodiment may further include a sensor part 240. The sensor part 240 includes a sensor for sensing the user's motion. For example, when the metaverse terminal 200 is an HMD, the sensor part 240 may include a Kinect sensor for detecting the user's motion and a wearable sensor attached to the user's body. However, the sensor part 240 is not limited thereto, and any sensor for detecting and recognizing the user's motion may be a sensor of the sensor part 240. The sensor part 240 may be a physically separate device from the metaverse terminal 200.

The sensor part 240 detects the user's motion and generates a motion control command for the user avatar. The second avatar controller 290 generates object motion data for controlling a motion of the user avatar placed in the virtual space according to the motion control command.

According to the present invention, it is possible to provide a virtual space implemented by synchronizing a situation in a virtual space with a situation in the real space.

In addition, according to the present invention, attributes and action patterns of objects active in the real space are statistically applied to AI characters active in a virtual space of a metaverse, and thus the virtual space can be efficiently implemented in synchronization with a situation in the real space.

Although the present invention has been described through exemplary embodiments with reference to the accompanying drawings, the present invention is not limited to the embodiments. Various modified examples that may be derived from the embodiments by those skilled in the art are construed as falling within the scope of the present invention. The claims are intended to encompass the modified examples.

What is claimed is:

1. A metaverse system comprising:

a metaverse server; and at least one metaverse terminal configured to receive and play metaverse content, wherein the metaverse server comprises:

at least one processor, and at least one memory, wherein the at least one processor, by executing program command sets stored in the at least one memory, is configured to perform:

an object information collection operation to detect objects in a target space by analyzing an image captured through at least one camera and collect attribute information and action pattern information of each of the detected objects;

a first virtual object generation operation to statistically process the collected object-specific attribute information collected from the detected objects in the target space, and generate virtual objects without establishing a one-to-one correspondence with the detected objects, such that a statistical distribution of attributes of the virtual objects matches a statistical distribution of attributes of the detected objects in the target space;

a first virtual object placement operation to generate object placement information for placing the generated virtual objects in a virtual space accurately modeled from the target space;

a first virtual object motion control operation to statistically process the collected object-specific action pattern information collected from the detected objects in the target space, and generate object motion data without replicating individual actions of the detected objects, such that a statistical distribution of behaviors of the virtual objects matches a statistical distribution of behaviors of the detected objects in the target space;

a first rendering operation to render metaverse content using the virtual space, the object placement information, and the object motion data; and a metaverse content transmission operation to transmit the rendered metaverse content to a connected terminal.

2. The metaverse system of claim 1, wherein the at least one processor is further configured to perform a virtual space generation operation to generate the virtual space accurately modeled from the target space based on space information and placement information of things collected from the target space and a captured image of the target space.

3. The metaverse system of claim 2, wherein the virtual space generation operation collects external environment information and generates the virtual space reflecting the external environment information.

4. The metaverse system of claim 1, wherein the object information collection operation additionally collects object information and object attribute information from access information of a wireless communication connection device in the target space.

5. The metaverse system of claim 1, wherein the virtual space is divided into multiple areas, the object information collection operation collects object number information from each area of the target space corresponding to the virtual space, and the first virtual object placement operation places the objects in the areas of the virtual space based on the collected area-specific object number information.

6. The metaverse system of claim 1, wherein the at least one processor is further configured to perform a first avatar control operation to place a user avatar having attributes, which are set by a user who accesses the metaverse server, in the virtual space, and the first rendering operation renders the metaverse content from the user avatar's point of view.

7. The metaverse system of claim 6, wherein the metaverse terminal transmits motion control commands for the user avatar received via a user interface (UI) to the metaverse server, and the first avatar control operation generates object motion data for controlling motions of the user avatar placed in the virtual space.

8. The metaverse system of claim 6, wherein the metaverse terminal comprises a sensor configured to detect the user's motion and generate a motion control command for the user avatar, and transmits the generated motion control command for the user avatar to the metaverse server, and the first avatar control operation generates object motion data for controlling a motion of the user avatar placed in the virtual space.

9. A metaverse system comprising a metaverse server and at least one metaverse terminal, wherein the metaverse server comprises:

at least one processor, and at least one memory, wherein the at least one processor, by executing program command sets stored in the at least one memory, is configured to perform:

an object information collection operation to detect objects in a target space by analyzing an image captured in real time through at least one camera and collect attribute information and action pattern information defined for each of the detected objects; and a metaverse data transmission operation to transmit modeling data of a virtual space accurately modeled from the target space and collected object-specific attribute information and action pattern information to a connected terminal, and the metaverse terminal comprises:

at least one processor, and at least one memory, wherein the at least one processor, by executing program command sets stored in the at least one memory, is configured to perform:

a second virtual object generation operation to statistically process the collected object-specific attribute information collected from the objects detected in real time in the target space, and generate virtual objects without establishing a one-to-one correspondence with the detected objects, such that a statistical distribution of attributes of the virtual objects matches a statistical distribution of attributes of the detected objects in the target space;

a second virtual object placement operation to generate object placement information for placing the generated virtual objects in the virtual space;

a second virtual object motion control operation to statistically process the received object-specific action pattern information collected from the objects detected in real time in the target space, and generate object motion data without replicating individual actions of the detected objects, such that a statistical distribution of behaviors of the virtual objects matches a statistical distribution of behaviors of the detected objects in the target space;

a second rendering operation to render metaverse content in real time using the virtual space modeling data, the object placement information, and the object motion data; and a metaverse player to play the rendered metaverse content.

10. The metaverse system of claim 9, wherein the at least one processor of the metaverse server is further configured to perform a virtual space generation operation to generate the virtual space accurately modeled from the target space based on space information and placement information of things collected from the target space and a captured image of the target space.

11. The metaverse system of claim 10, wherein the virtual space generation operation collects external environment information and generates the virtual space reflecting the external environment information.

12. The metaverse system of claim 9, wherein the object information collection operation additionally collects object information and object attribute information from access information of a wireless communication connection device in the target space.

13. The metaverse system of claim 9, wherein the virtual space is divided into multiple areas, the object information collection operation collects object number information from each area of the target space corresponding to the virtual space, and the second virtual object placement operation places the objects in the areas of the virtual space based on the collected area-specific object number information.

14. The metaverse system of claim 9, wherein the at least one processor of the metaverse terminal is further configured to perform a second avatar control operation to place a user avatar having attributes set by a user in the virtual space, and the second rendering operation renders the metaverse content from the user avatar's point of view.

15. The metaverse system of claim 14, wherein the second avatar control operation generates object motion data for controlling motions of the user avatar placed in the virtual space in response to a motion control command for the user avatar received via a user interface (UI).

16. The metaverse system of claim 14, wherein the metaverse terminal comprises a sensor configured to detect the user's motion and generate a motion control command for the user avatar, and the second avatar control operation generates object motion data for controlling a motion of the user avatar placed in the virtual space according to the generated motion control command for the user avatar.

* * * * *